(12) United States Patent
Sonoda et al.

(10) Patent No.: US 11,081,929 B2
(45) Date of Patent: Aug. 3, 2021

(54) MOTOR

(71) Applicant: Nidec Corporation, Kyoto (JP)

(72) Inventors: Masashi Sonoda, Kyoto (JP); Akihiro Okita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 21 days.

(21) Appl. No.: 16/461,018

(22) PCT Filed: Nov. 2, 2017

(86) PCT No.: PCT/JP2017/039716
§ 371 (c)(1),
(2) Date: May 15, 2019

(87) PCT Pub. No.: WO2018/100966
PCT Pub. Date: Jun. 7, 2018

(65) Prior Publication Data
US 2019/0305631 A1    Oct. 3, 2019

(30) Foreign Application Priority Data

Nov. 30, 2016   (JP) .............................. JP2016-232692

(51) Int. Cl.
*H02K 3/50*    (2006.01)
*H02K 5/173*   (2006.01)
(Continued)

(52) U.S. Cl.
CPC ........... *H02K 5/1732* (2013.01); *F16C 19/06* (2013.01); *H02K 3/50* (2013.01); *H02K 5/132* (2013.01);
(Continued)

(58) Field of Classification Search
CPC ........ H02K 5/1732; H02K 3/50; H02K 5/132; H02K 5/173; H02K 5/225; H02K 5/24; H02K 7/083; F16C 19/06
(Continued)

(56) References Cited

U.S. PATENT DOCUMENTS 5,126,608 A * 6/1992 Sogabe .................. H02K 5/225
                                                    310/71
5,895,207 A * 4/1999 Burgdorf ................ B60T 8/368
                                                    417/410.1
(Continued)

FOREIGN PATENT DOCUMENTS

JP      10-56751 A      2/1998
JP    2004-129418 A     4/2004
(Continued)

OTHER PUBLICATIONS

Official Communication issued in International Patent Application No. PCT/JP2017/039716, dated Jan. 9, 2018.

*Primary Examiner* — Terrance L Kenerly
(74) *Attorney, Agent, or Firm* — Keating & Bennett

(57) ABSTRACT

A motor includes a bearing holder and a first bearing. The bearing holder is fixed to a casing. The first bearing is interposed between the bearing holder and a shaft. The bearing holder includes a holder main body made of a resin and a ring made of a metal. The holder main body includes, around the central axis, a first arcuate portion including one or a plurality of through-holes passing therethrough in an axial direction and a second arcuate portion that does not include a through-hole. The first arcuate portion occupies a range of about ⅓ or more of a total circumference of the holder main body in a circumferential direction. An outer ring of the first bearing is held by the ring.

15 Claims, 5 Drawing Sheets

(51) Int. Cl.
*F16C 19/06* (2006.01)
*H02K 5/132* (2006.01)
*H02K 5/22* (2006.01)
*H02K 5/24* (2006.01)
*H02K 7/08* (2006.01)
*F04B 17/03* (2006.01)

(52) U.S. Cl.
CPC .............. *H02K 5/173* (2013.01); *H02K 5/225* (2013.01); *H02K 5/24* (2013.01); *H02K 7/083* (2013.01); *F04B 17/03* (2013.01); *F16C 2380/26* (2013.01); *H02K 2203/09* (2013.01)

(58) Field of Classification Search
USPC ....................................................... 310/90, 51
See application file for complete search history.

(56) References Cited

U.S. PATENT DOCUMENTS

| | | | | |
|---|---|---|---|---|
| 5,905,320 | A | * | 5/1999 | Periyathamby .......... H02K 5/24 310/51 |
| 6,150,743 | A | * | 11/2000 | Van Dine ................. H02K 5/00 310/43 |
| 2005/0155444 | A1 | * | 7/2005 | Otaki ..................... H02K 7/083 74/89 |
| 2012/0186896 | A1 | * | 7/2012 | Yamamoto ........... B62D 5/0448 180/444 |
| 2016/0013697 | A1 | | 1/2016 | Haga et al. |

FOREIGN PATENT DOCUMENTS

JP        2009-213275 A        9/2009
JP        2015-104168 A        6/2015

* cited by examiner

MOTOR

CROSS REFERENCE TO RELATED APPLICATIONS

This is the U.S. national stage of application No. PCT/JP2017/039716, filed on Nov. 2, 2017, and priority under 35 U.S.C. § 119(a) and 35 U.S.C. § 365(b) is claimed from Japanese Application No. 2016-232692, filed Nov. 30, 2016, the entire contents of which are incorporated herein by reference.

1. FIELD OF THE INVENTION

The present disclosure relates to a motor.

2. BACKGROUND

Conventionally, a so-called inner rotor type motor in which a rotor rotates inside a stator is known.

In an inner rotor type motor, a shaft that rotates together with a rotor is supported by a pair of bearings disposed above and below the rotor. An outer ring of the bearing is press-fitted into a bearing holder formed of a resin that is fixed to a stator. However, a thermal expansion coefficient of an outer ring formed of a metal and a thermal expansion coefficient of a bearing holder formed of a resin are largely different. For this reason, when heat generated during driving of a motor is conducted to the outer ring and the bearing holder, the outer ring and the bearing holder expand with different thermal expansion coefficients. As a result, a problem occurs in that the state in which the outer ring is fitted into the bearing holder is degraded.

SUMMARY

An example embodiment of the present disclosure is an inner rotor motor including a shaft rotating about a central axis extending vertically, a rotor rotating together with the shaft, a stator located radially outside of the rotor, a casing accommodating the rotor and the stator therein, a bearing holder fixed to the casing, and a first bearing interposed between the bearing holder and the shaft. The bearing holder includes a holder main body made of a resin and a ring made of a metal which holds an outer ring of the first bearing. The holder main body includes, around the central axis, a first arcuate portion including one or a plurality of through-holes passing therethrough in an axial direction and a second arcuate portion that does not include a through-hole, and the first arcuate portion occupies a range of about ⅓ or more of a total circumference of the holder main body in a circumferential direction.

The above and other elements, features, steps, characteristics and advantages of the present disclosure will become more apparent from the following detailed description of the example embodiments with reference to the attached drawings.

BRIEF DESCRIPTION OF THE DRAWINGS

FIG., a holder main body includes, around the central axis, a first arcuate portion having a through-hole and a second arcuate portion not having a through-hole. For this reason, stress generated in the holder main body due to thermal expansion or thermal shrinkage tends to be uneven in a circumferential direction, an outer ring of a first bearing is held by a ring member formed of a metal. For this reason, a problem in that a state in which the outer ring is fitted into the bearing holder is degraded due to a change in temperature is unlikely to occur.

DETAILED DESCRIPTION

Hereinafter, example embodiments of the present disclosure will be described with reference to the drawings. Further, in the present application, a direction parallel to a central axis of a motor will be referred to as "axial direction," a direction orthogonal to the central axis of the motor will be referred to as "radial direction," and a direction along a circular arc with the central axis of the motor as the center will be referred to as "circumferential direction." However, the above-described "parallel direction" also includes a substantially parallel direction. Also, the above-described "orthogonal direction" also includes a substantially orthogonal direction.

Also, in the present application, the shape and positional relationship of each part will be described with the axial direction as a vertical direction and a first bearing side as an upper side with respect to a stator. However, there is no intention to limit orientations of the motor according to the present disclosure during manufacture and use thereof by the definition of the vertical direction.

Figure 1:
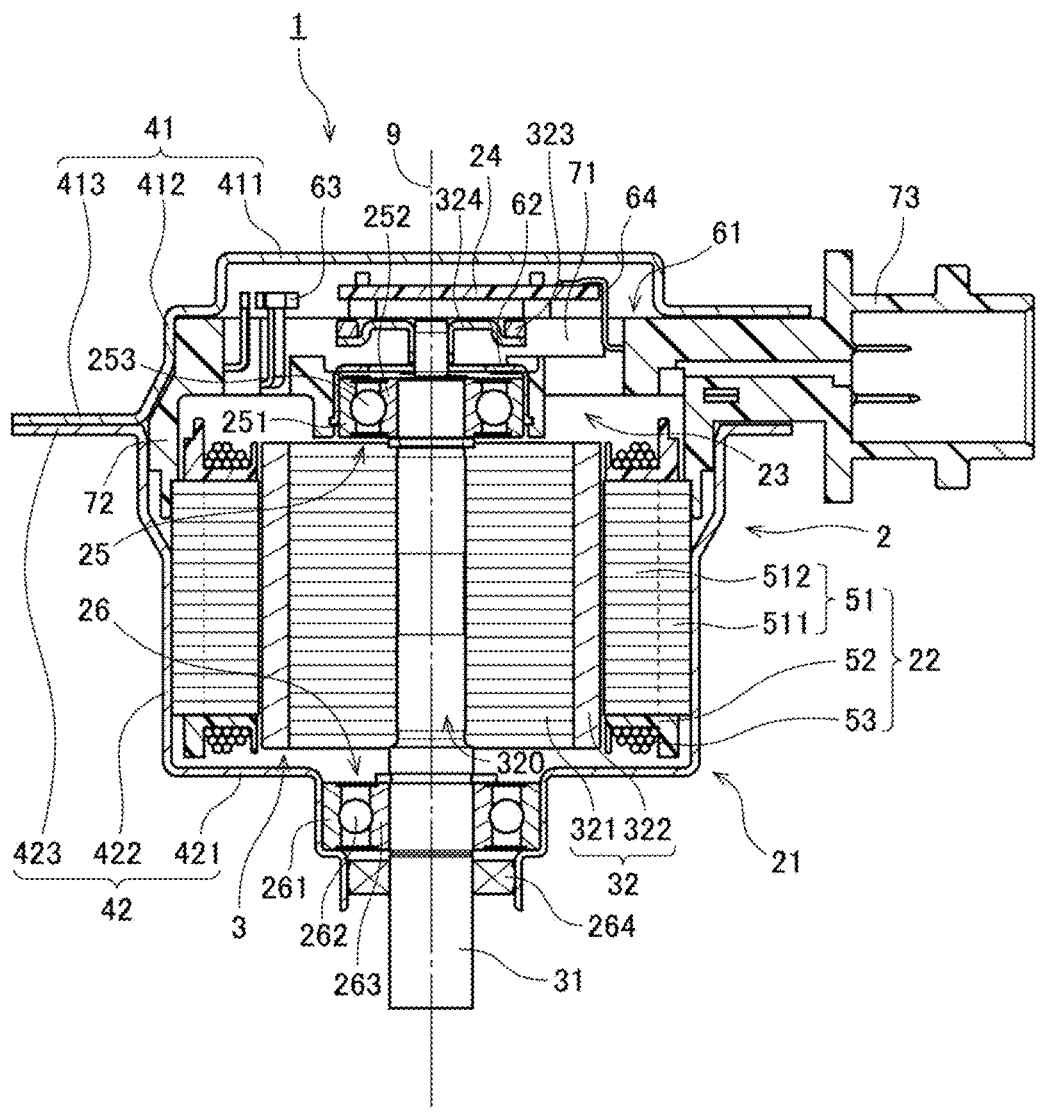
FIG. 1 is a longitudinal cross-sectional view of a motor.

FIG. 1 is a longitudinal cross-sectional view of a motor 1 according to an example embodiment of the present disclosure. The motor 1 is a so-called inner rotor type motor in which a rotor 32 is disposed radially inside of an annular stator 22.

As illustrated in FIG. 1, the motor 1 has a stationary part 2 including the stator 22 and a rotating part 3 including the rotor 32. The stationary part 2 is fixed to a frame body of a device on which the motor 1 is mounted. The rotating part 3 is rotatably supported with respect to the stationary part 2. During driving of the motor 1, the rotating part 3 rotates about a central axis 9.

As illustrated in FIG. 1, the stationary part 2 has a casing 21, the stator 22, a bearing holder 23, a circuit board 24, a first bearing 25, and a second bearing 26.

The casing 21 is a housing accommodating the stator 22 and the rotor 32 therein. The casing 21 of the present example embodiment has a first casing member 41 and a second casing member 42. As a material of the first casing member 41 and the second casing member 42, for example, a metal is used. The first casing member 41 has an upper plate part 411, a first cylindrical part 412, and a first joint part 413. Above the bearing holder 23, the upper plate part 411 expands substantially perpendicular to the axial direction. The first cylindrical part 412 extends downward from an outer circumferential portion of the upper plate part 411. The first cylindrical part 412 partially covers an outer circumferential portion of the bearing holder 23. The first joint part 413 expands radially outward from a lower end part of the first cylindrical part 412.

The second casing member 42 is located at a lower side of the first casing member 41. The second casing member 42 has a bottom plate part 421, a second cylindrical part 422, and a second joint part 423. Below the stator 22 and the rotor 32, the bottom plate part 421 expands substantially perpendicular to the axial direction. The second cylindrical part 422 extends upward from an outer circumferential portion of the bottom plate part 421. The second cylindrical part 422 covers an outer circumferential portion of the stator 22. The second joint part 423 expands radially outward from an upper end part of the second cylindrical part 422. The first joint part 413 and the second joint part 423 are fixed by, for example, a screw clamp.

The stator 22 is an armature that causes a rotating magnetic field to be generated in accordance with a driving current. The stator 22 is held by the second cylindrical part 422 and is located radially inward of the second cylindrical part 422 or radially outward of the rotor 32. As illustrated in FIG. 1, the stator 22 has a stator core 51, an insulator 52, and a coil 53.

The stator core 51 is an annular magnetic body. For the stator core 51, for example, a laminated steel plate is used. The stator core 51 has an annular core back 511 and a plurality of teeth 512 protruding radially inward from the core back 511. The core back 511 is fixed to an inner circumferential surface of the second cylindrical part 422. The stator core 51 may be a single member or a combination of a plurality of members.

The insulator 52 is formed of a resin which is an insulating material. The insulator 52 covers an upper surface, a lower surface, and both circumferential side surfaces of each tooth 512. The coil 53 is formed of a conductive wire which is wound around the teeth 512 with the insulator 52 interposed therebetween. The insulator 52 is interposed between the teeth 512 and the coil 53 to electrically insulate the teeth 512 and the coil 53 from each other.

The motor 1 is a three-phase synchronous motor driven by three-phase alternating currents of the U-phase, V-phase, and W-phase. For this reason, a plurality of coils 53 include at least three conductive wires including a U-phase conductive wire to which the U-phase current is supplied, a V-phase conductive wire to which the V-phase current is supplied, and a W-phase conductive wire to which the W-phase current is supplied.

The bearing holder 23 is located at the upper side of the stator 22 and the rotor 32 and at a lower side of the upper plate part 411. In an example embodiment of the present inventive concept, by the bearing holder 23 being sandwiched between the stator core 51 and the first casing member 41, the bearing holder 23 is fixed to the casing 21. However, the bearing holder 23 may also be fixed to the casing 21 using other means such as an adhesive, a screw clamp, or the like.

The bearing holder 23 has a holder main body 61 formed of a resin, a ring member 62 formed of a metal, a plurality of bus bars 63 formed of metal, and a plurality of connecting members 64 formed of a metal. The ring member 62 holds an outer ring of the first bearing 25 which will be described below. The bus bars 63 are electrically connected to end parts of a plurality of conductive wires withdrawn from the coil 53. The connecting members 64 are electrically connected to the circuit board 24. When manufacturing the bearing holder 23, so-called insert molding is performed in which, in a state in which the ring member 52, the bus bars 63, and the connecting members 64 are disposed inside a metal mold in advance, a resin is poured into the metal mold and cured. That is, the bearing holder 23 is a resin molded product having the ring member 62, the bus bars 63, and the connecting members 64 as insert parts.

By using the insert molding, it is possible to simultaneously perform molding of the holder main body 61 and fixing the ring member 62, the bus bars 63, and the connecting members 64 to the holder main body 61. Accordingly, a manufacturing process of the bearing holder 23 can be shortened. Also, by using the insert molding, the ring member 62, the bus bars 63, and the connecting members 64 can be firmly fixed to the holder main body 61.

Further, a more detailed structure of the bearing holder 23 will be described below.

The circuit board 24 is disposed above the bearing holder 23 to be perpendicular to the central axis 9. A sensor for detecting a change in a magnetic pole of a rotational position detecting magnet 323, which will be described below, is mounted on the circuit board 24. During the driving of the motor 1, a signal based on the detected change in the magnetic pole is output to an external control unit through the connecting members 64. Also, a driving current is supplied to the coil 53 of the stator 22 from an external power supply device through the bus bars 63.

The first bearing 25 and the second bearing 26 are mechanisms rotatably supporting a shaft 31 which will be described below. The first bearing 25 is located above the stator 22 and the rotor 32. The second bearing 26 is located below the stator 22 and the rotor 32.

The first bearing 25 is interposed between the bearing holder 23 and the shaft 31. In an example embodiment of the present inventive concept, a ball bearing is used as the first bearing 25. The first bearing 25 has an outer ring 251, an inner ring 252, and a plurality of spheres 253. The outer ring 251 is held by an inner circumferential surface of the ring member 62. The inner ring 252 is fixed to an outer circumferential surface of the shaft 31. The plurality of spheres 253 are interposed between the outer ring 251 and the inner ring 252. Consequently, with respect to the bearing holder 23, the shaft 31 is supported to be rotatable about the central axis 9.

The second bearing 26 is interposed between the casing 21 and the shaft 31. In an example embodiment of the present inventive concept, a ball bearing is used as the second bearing 26. The second bearing 26 has an outer ring 261, an inner ring 262, and a plurality of spheres 263. The outer ring 261 is fixed to the second casing member 42. The inner ring 262 is fixed to the outer circumferential surface of the shaft 31. The plurality of spheres 263 are interposed between the outer ring 261 and the inner ring 262. Consequently, with respect to the casing 21, the shaft 31 is supported to be rotatable about the central axis 9.

As illustrated in FIG. 1, the rotating part 3 has the shaft 31 and the rotor 32.

The shaft 31 is a columnar member extending along the central axis 9. As a material of the shaft 31, for example, a metal, such as stainless steel, is used. The shaft 31 is rotatably supported by the first bearing 25 and the second bearing 26. An upper end part of the shaft 31 protrudes more upward than the rotor 32 and is accommodated in the casing 21. The rotational position detecting magnet 323 is provided on the upper end part of the shaft 31 with a yoke 324 interposed therebetween. A lower end part of the shaft 31 protrudes more downward than the rotor 32 and protrudes more downward than the bottom plate part 421 of the casing 21. That is, the lower end part of the shaft 31 protrudes from the casing 21 toward a second area A2 which will be described below.

The rotor 32 has a rotor core 321 and a plurality of driving magnets 322. The rotor core 321 is a cylindrical magnetic body. For the rotor core 321, for example, a laminated steel plate is used. The rotor core 321 has an insertion hole 320. At the center of the rotor core 321, the insertion hole 320 passes through the laminated steel plate in the axial direction. The shaft 31 is press-fitted into the insertion hole 320. Consequently, the shaft 31 and the rotor core 321 are fixed to each other.

The plurality of driving magnets 322 are fixed to an outer circumferential surface of the rotor core 321. A radially outer surface of each driving magnet 322 is a magnetic pole surface of an N pole or a magnetic pole surface of an S pole. The plurality of driving magnets 322 are arranged in the circumferential direction so that the magnetic pole surface of the N pole and the magnetic pole surface of the S pole are alternately arranged. A radially inner end surface of the tooth 512 and a radially outer surface of the driving magnet 322 face in the radial direction.

During the driving of the motor 1, a driving current is supplied to the coil 53 from the external power supply device through the bus bar 63. Then, a rotational magnetic field is generated in the plurality of teeth 512 of the stator core 51. Consequently, circumferential torque is generated between the teeth 512 and the driving magnets 322. As a result, the shaft 31 and the rotor 32 rotate about the central axis 9.

A component to be driven is connected to the lower end part of the shaft 31 directly or via a power transmission mechanism such as a gear. That is, in an example embodiment of the present inventive concept, power of the motor 1 is output from the lower end part of the shaft 31. For this reason, of the first bearing 25 and the second bearing 26, a larger load tends to be applied to the second bearing 26, which is located at an output side, than to the first bearing 25. Thus, in an example embodiment of the present inventive concept, a bearing larger than the first bearing 25 is used for the second bearing 26. Specifically, a dimension of the second bearing 26 in the axial direction is larger than a dimension of the first bearing 25 in the axial direction. Also, a dimension of the second bearing 26 in the radial direction is larger than a dimension of the first bearing 25 in the radial direction. Consequently, during the driving of the motor 1, the shaft 31 is more stably supported.

Next, a more detailed structure of the bearing holder 23 will be described.

Figure 2:
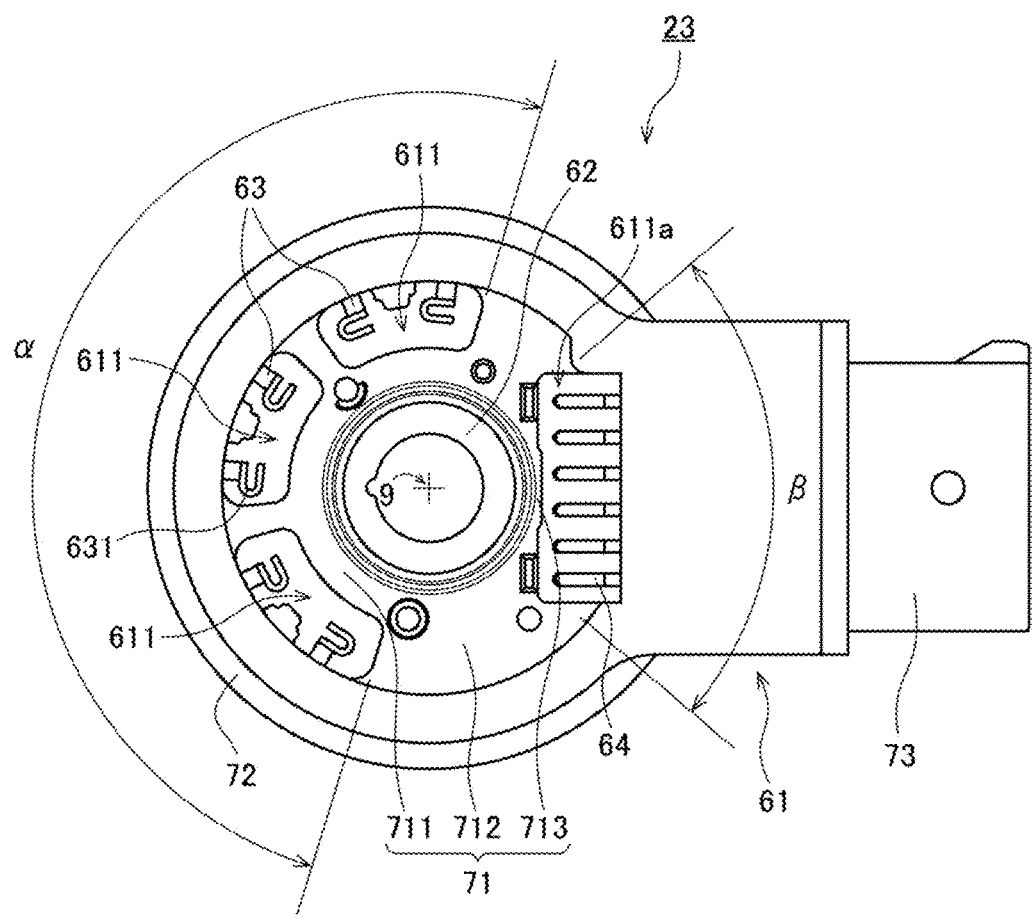
FIG. 2 is a top view of a bearing holder.

FIG. 2 is a top view of the bearing holder 23. As described above, the bearing holder 23 has the holder main body 61, the ring member 62, the plurality of bus bars 63, and the plurality of connecting members 64.

As illustrated in FIGS. 1 and 2, the holder main body 61 has a disk part 71, an annular leg part 72, and a connector part 73. The disk part 71 surrounds the periphery of the central axis 9 in an annular shape and expands perpendicularly to the central axis 9. The annular leg part 72 extends downward in a cylindrical shape from an outer circumferential portion of the disk part 71. A lower end part of the annular leg part 72 and an upper end part of the stator core 51 come into contact with each other. The connector part 73 protrudes radially outward from a portion of the disk part 71 in the circumferential direction. A radially outer end part of the connector part 73 is exposed to the outside of the casing 21.

Figure 3:
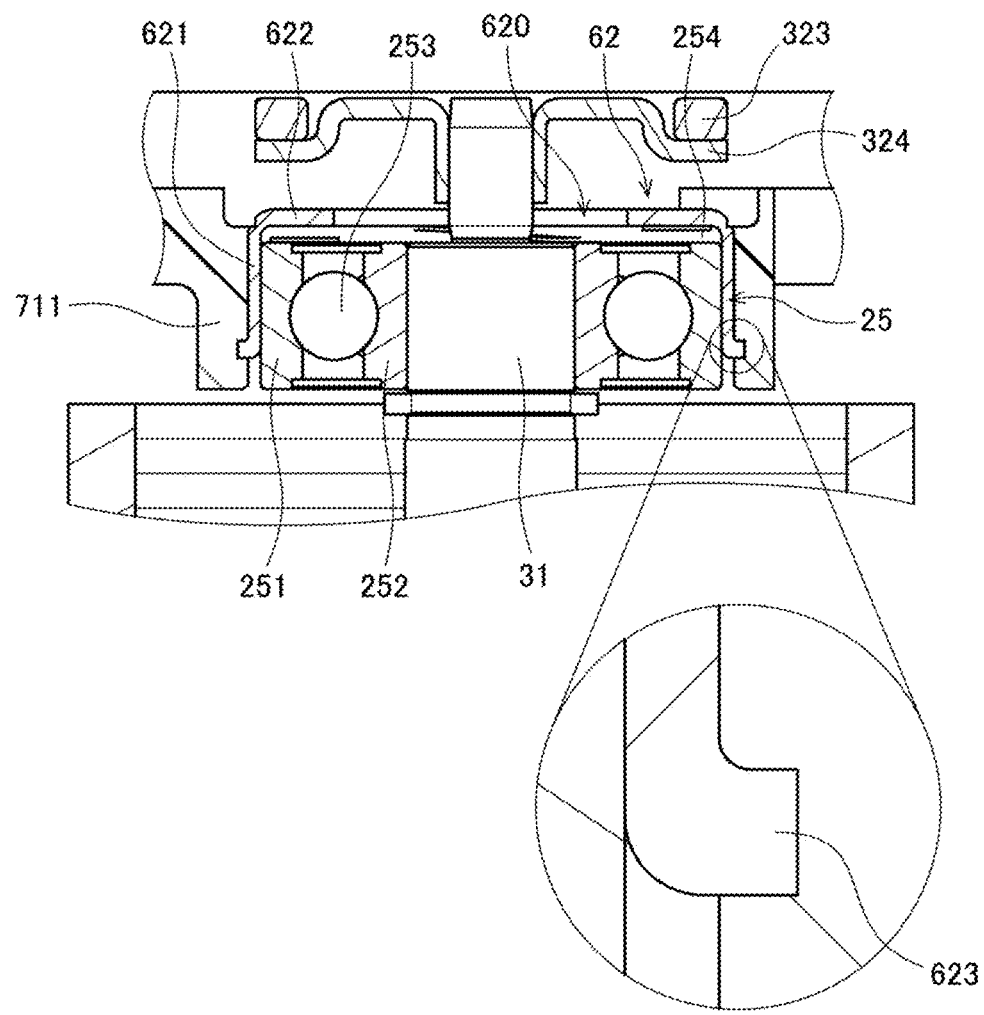
FIG. 3 is a cross-sectional view of a vicinity of a first bearing.
Figure 4:
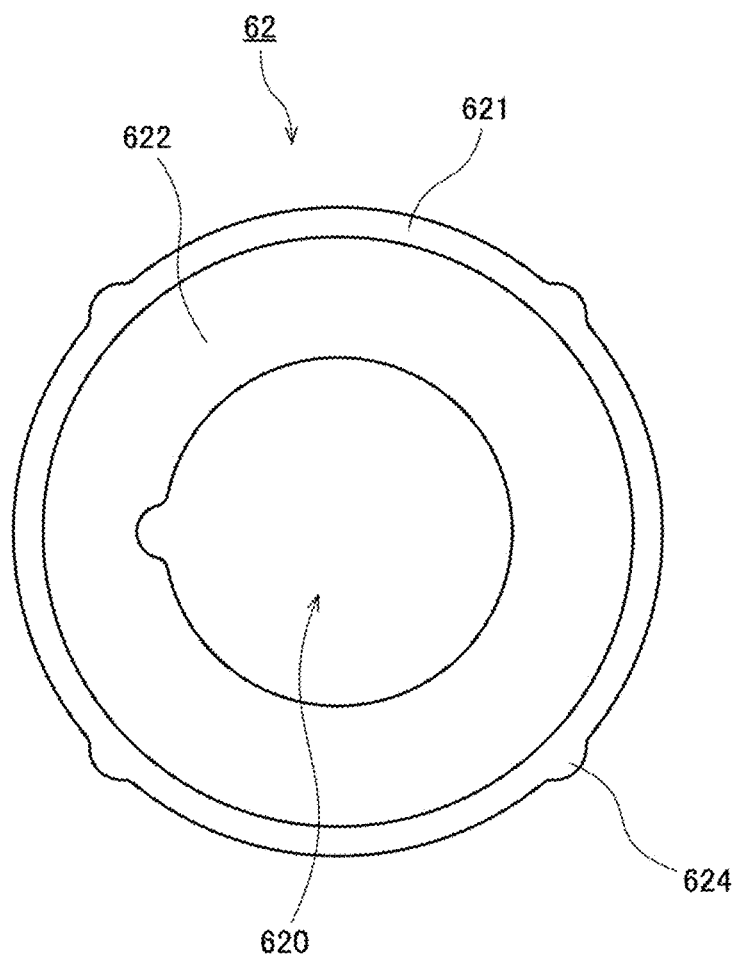
FIG. 4 is a bottom view of a ring member.

The ring member 62 is a member holding the outer ring 251 of the first bearing 25. As a material of the ring member 62, for example, a metal such as iron is used. A rigidity of the ring member 62 is at least higher than a rigidity of the holder main body 61. FIG. 3 is a cross-sectional view of the vicinity of the first bearing 25. FIG. 4 is a bottom view of the ring member 62. As illustrated in FIGS. 3 and 4, the ring member 62 has a cylindrical part 621, a top plate part 622, a flange part 623, and a plurality of convex parts 624. The cylindrical part 621 is a cylindrical portion surrounding the periphery of the first bearing 25. An inner circumferential surface of the cylindrical part 621 comes into contact with an outer circumferential surface of the outer ring 251 of the first bearing 25. Above the outer ring 251 of the first bearing 25, the top plate part 622 extends radially inward from the cylindrical part 621. The ring member 62 has a circular opening 620 formed radially inward of the top plate part 622. The shaft 31 is inserted into the opening 620.

The flange part 623 protrudes radially outward from a lower end part of the cylindrical part 621. As shown enlarged in FIG. 3, an upper surface, a lower surface, and an outer circumferential surface of the flange part 623 are covered by a resin constituting the holder main body 61. That is, in an example embodiment of the present inventive concept, the upper surface and the lower surface of the flange part 623 are axial contact surfaces that come into contact with the holder main body 61 in the axial direction. Consequently, positional misalignment between the ring member 62 and the holder main body 61 in the axial direction is suppressed.

At a portion of the ring member 62 in the circumferential direction, the convex part 624 protrudes radially outward from an outer circumferential surface of the flange part 623. As illustrated in FIG. 4, the ring member 62 of the present example embodiment has four convex parts 624. The four convex parts 624 are disposed at equal intervals in the circumferential direction. Both circumferential end surfaces and a radial outer side of each convex part 624 are covered by the resin constituting the holder main body 61. That is, in an example embodiment of the present inventive concept, the both circumferential end surfaces of the convex part 624 are circumferential contact surfaces that come into contact with the holder main body 61 in the circumferential direction. Consequently, the ring member 62 is suppressed from rotating in the circumferential direction with respect to the holder main body 61.

However, the number of the convex parts 624 of the ring member 62 may be 1 to 3, or 5 or more. Also, the interval between adjacent convex parts 624 in the circumferential direction may not be constant. Also, instead of the convex part 624, the ring member 62 may have a concave part which is concave radially inward from the outer circumferential surface of the flange part 623. Then, rotation of the ring member 62 with respect to the holder main body 61 may be suppressed by a circumferential contact surface of the concave part.

As illustrated in FIG. 3, a preload spring 254 is interposed between the outer ring 251 of the first bearing 25 and the top plate part 622 of the ring member 62. Also, the outer ring 251 of the first bearing 25 is slightly movable in the axial direction with respect to the ring member 62. The preload spring 254 applies a downward elastic force to the outer ring 251 of the first bearing 25. Consequently, a downward biasing force acts on the first bearing 25 and the second bearing 26, and a location of each member constituting the bearings 25 and 26 is stabilized. Particularly, in an example embodiment of the present inventive concept, an upper end part of the preload spring 254 comes into contact with the top plate part 622 of the ring member 62 formed of a metal having high rigidity instead of a resin. Consequently, a stronger pressure can be applied from the preload spring 254 to the outer ring 251.

It is desirable that the preload spring 254 be disposed at either side of the first bearing 25 or the second bearing 26. However, in an example embodiment of the present inventive concept, a larger load is applied to the second bearing 26, which is located at the output side, than to the first bearing 25. For this reason, the outer ring 261 and the inner ring 262 of the second bearing 26 are fixed together with the second casing member 42 and the shaft 31, respectively, so as to be immovable in the axial direction. Consequently, vibration of the shaft 31 is suppressed. Also, the performance of an oil seal 264 located at a lower side of the second bearing 26 is properly maintained. In this way, in the case in which the outer ring 261 and the inner ring 262 of the second bearing 26 are fixed, it is desirable that the preload spring 254 be disposed at the first bearing 25 side as in an example embodiment of the present inventive concept.

The plurality of bus bars 63 are members electrically connected to the coil 53. As a material of the bus bars 63, a metal which is a conductor is used. The bearing holder 23 of the present example embodiment has a pair of bus bars 63 for the U-phase, a pair of bus bars 63 for the V-phase, and a pair of bus bars 63 for the W-phase. A portion of each bus bar 63 is held by the holder main body 61. Also, each bus bar 63 has a U-shaped terminal 631. The terminal 631 is located above the disk part 71.

The disk part 71 of the holder main body 61 has a plurality of arcuate through-holes 611 and a single rectangular through-hole 611a. Below the terminal 631, each through-hole 611 passes through the holder main body 61 in the axial direction. The conductive wire of each phase of the U-phase, V-phase, and W-phase withdrawn from the coil 53 is connected to the terminal 631 of the bus bar 63 through the through-hole 611. Consequently, the coil 53 and the bus bars 63 are electrically connected. Within the through-hole 611, the terminal 631 protrudes from an inner circumferential surface of the disk part 71 and is located above the disk part 71.

The plurality of connecting members 64 are members electrically connecting the external control unit and the circuit board 24. As a material of the connecting members 64, a metal which is a conductor is used. One end part of each connecting member 64 is held by the connector part 73. The other end part of each connecting member 64 protrudes from an inner circumferential portion of the connector part 73 within the through-hole 611a and is connected to the circuit board 24 above the holder main body 61.

The disk part 71 of the holder main body 61 has, around the central axis 9, a first arcuate portion 711 having the above-described plurality of through-holes 611, a second arcuate portion 712 not having the through-holes 611 and 611a, and a third arcuate portion 713 having the through-hole 611a. The first arcuate portion 711 and the third arcuate portion 713 occupy a range of ⅓ or more in the circumferential direction. In the example of FIG. 2, an angle α around the central axis 9 corresponding to the first arcuate portion 711 is about 180° (substantially half circumference). An angle β, around the central axis 9 corresponding to the third arcuate portion 713 is about 80°. Therefore, because an angle α+β around the central axis 9 of the first arcuate portion 711 and the third arcuate portion 713 is about 260°, in the disk part 71, the arcuate portions around the central axis 9 having the through-holes 611 and 611a occupy a range of ⅓ or more in the circumferential direction.

In such a structure, stress generated in the holder main body 61 due to thermal expansion or thermal shrinkage tends to be uneven in the circumferential direction. Particularly, in the present example embodiment, a portion having through-holes in which the first arcuate portion 711 and the third arcuate portion 713 are combined is unevenly distributed in the circumferential direction and occupies a range of half circumference or more in the circumferential direction. For this reason, the stress generated in the holder main body 61 due to thermal expansion or thermal shrinkage tends to be more uneven. That is, in the disk part 71, because the portion having through-holes has a smaller thickness and a lower rigidity as compared with a portion not having a through-hole, as much as the differences in the thickness and rigidity, the influence of thermal expansion and thermal shrinkage is more likely to occur in the portion having through-holes. Although the portion is negligible in a case in which the portion occupies a small proportion in the disk part 71 around the central axis 9, as the through-holes are more unevenly distributed and the proportion of the portion becomes larger, the influence thereof becomes more significant. It is found that a threshold at which the influence becomes significant is the case in which the portion having through-holes occupies the range of ⅓ or more in the circumferential direction.

In an example embodiment of the present inventive concept, although the portion having through-holes occupies the range of ⅓ or more in the circumferential direction in the disk part 71, the outer ring 251 of the first bearing 25 is held by the ring member 62 formed of a metal. For this reason, a problem in that a state in which the outer ring 251 is fitted into the bearing holder 23 is degraded due to a change in temperature is unlikely to occur.

Further, in an example embodiment of the present inventive concept, although the portion in which the first arcuate portion 711 and the third arcuate portion 713 are combined corresponds to the first arcuate portion in the claims, in the case of the form not having the through-hole 611a, only the first arcuate portion 711 corresponds to the first arcuate portion in the claims.

Also, the bearing holder 23 of the present example embodiment is obtained by resin molding using the ring member 62 as an insert part. For this reason, positional misalignment between the ring member 62 and the holder main body 61 is unlikely to occur. For this reason, the state in which the outer ring 251 is fitted into the bearing holder 23 can be more properly maintained.

It is desirable that the outer ring 251 of the first bearing 25 and the ring member 62 have thermal expansion coefficients close to each other. Specifically, it is desirable that a difference between a thermal expansion coefficient of a material used for the outer ring 251 of the first bearing 25 and a thermal expansion coefficient of a material used for the ring member 62 be smaller than a difference between the thermal expansion coefficient of the material used for the ring member 62 and a thermal expansion coefficient of the material used for the holder main body 61. In this way, the state in which the outer ring 251 is fitted into the bearing holder 23 can be further suppressed from being changed due to a change in temperature.

Figure 5:
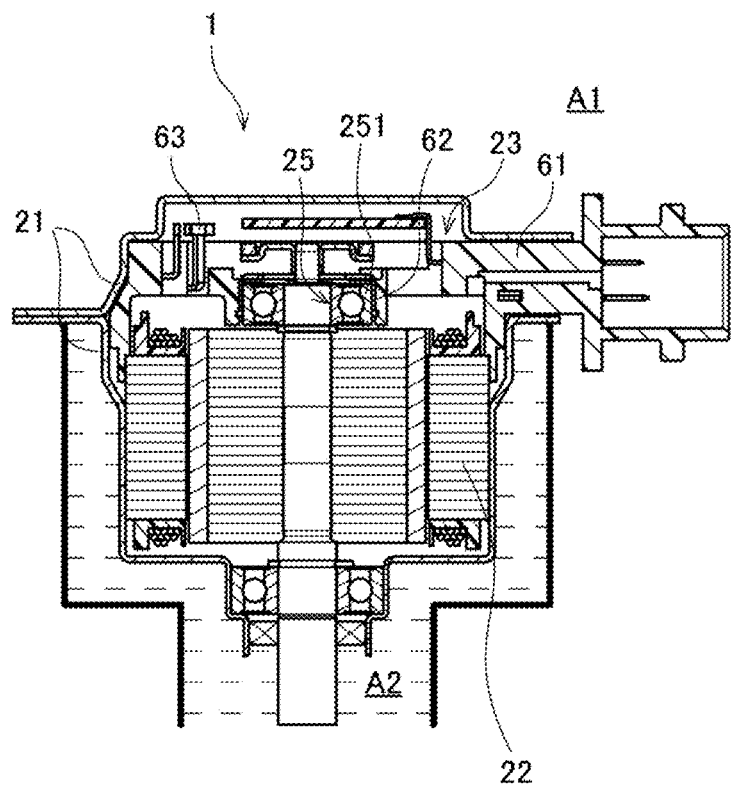
FIG. 5 is a view illustrating a use environment of a motor.

FIG. 5 is a view illustrating an example of a use environment of the motor 1 according to an example embodiment of the present disclosure. FIG. 5 illustrates a form in which the motor 1 is used for an oil pump. As illustrated in FIG. 5, a part of the motor 1 is disposed in a liquid environment. That is, the casing 21 of the motor 1 is disposed to stretch over a first area A1 in a gas environment and the second area A2 in the liquid environment that is located below the first area A1. The gas in the first area A1 is, for example, air. The liquid in the second area A2 is, for example, oil. During the operation of the motor, a temperature of the gas in the first area A1 is lower than a temperature of the liquid in the second area A2.

During use of the motor 1, heat generated in the stator 22 is mostly dissipated toward the first area A1. Accordingly, a temperature of the first bearing 25, which is located on a heat dissipation path, largely changes between when the motor 1 is used and when the motor 1 is stopped. However, in the structure of the present disclosure, the outer ring 251 of the first bearing 25 is held by the ring member 62 formed of a metal. For this reason, the problem in that the state in which the outer ring 251 is fitted into the bearing holder 23 is degraded due to a change in temperature is unlikely to occur.

Further, in an example embodiment of the present inventive concept, the upper surface of the top plate part 622 of the ring member 62 is exposed from the holder main body 61. For this reason, in comparison to the case in which the upper surface of the top plate part 622 is covered by the holder main body 61, the heat accumulated in the ring member 62 can be efficiently dissipated upward. Accordingly, excessive increase in the temperature of the ring member 62 is suppressed. Consequently, a change in the state in which the outer ring 251 is fitted into the bearing holder 23 due to thermal deformation of the ring member 62 and surrounding members thereof can be further suppressed.

An exemplary example embodiment of the present disclosure has been described above, but the present disclosure is not limited to the above example embodiment.

In the above example embodiment, the plurality of arcuate through-holes 611 are formed in the disk part 71 of the holder main body 61. However, the number of through-holes 611 formed in the holder main body 61 may also be 1.

Also, the motor for an oil pump has been described in the above example embodiment. However, the stator and the motor of the present disclosure may also be used for other purposes. For example, the stator and the motor may also be used for power steering, an engine cooling fan, or a water pump of an automobile. Also, the motor of the present disclosure may be mounted on a home appliance, an office automation (OA) apparatus, a medical apparatus, or the like and may generate various driving forces.

According to an example embodiment of the present disclosure, a holder main body includes, around the central axis, a first arcuate portion having a through-hole and a second arcuate portion not having a through-hole. For this reason, stress generated in the holder main body due to thermal expansion or thermal shrinkage tends to be uneven in a circumferential direction. However, in a structure of the present disclosure, an outer ring of a first bearing is held by a ring member formed of a metal. For this reason, a problem in that a state in which the outer ring is fitted into the bearing holder is degraded due to a change in temperature is unlikely to occur.

The present disclosure can be applied to, for example, a motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor, which is an inner rotor motor, the motor comprising:
    a shaft rotating about a central axis extending vertically in an axial direction;
    a rotor rotating together with the shaft;
    a stator located radially outside of the rotor;
    a casing accommodating the rotor and the stator therein;
    a bearing holder fixed to the casing; and
    a first bearing interposed between the bearing holder and the shaft; wherein
    the bearing holder includes a holder main body made of a resin and a ring made of a metal which holds an outer ring of the first bearing;
    the holder main body includes, around the central axis, a first arcuate portion including one or a plurality of through-holes passing therethrough in an axial direction and a second arcuate portion that does not include a through-hole;
    the first arcuate portion occupies a range of about ⅓ or more of a total circumference of the holder main body in a circumferential direction; and
    a difference between a thermal expansion coefficient of a material of the outer ring of the first bearing and a thermal expansion coefficient of a material of the ring is smaller than a difference between the thermal expansion coefficient of the material of the ring and a thermal expansion coefficient of the material of the holder main body.

2. The motor according to claim 1, wherein
    an inner ring of the first bearing is fixed to the shaft;
    the outer ring of the first bearing is axially movable with respect to the bearing holder; and
    the motor further includes a preload spring interposed between the outer ring of the first bearing and the bearing holder.

3. The motor according to claim 2, wherein the ring includes:
    a cylindrical portion contacting an outer circumferential surface of the outer ring; and
    a top plate portion extending radially inward from the cylindrical part above the outer ring; and
    the preload spring is interposed between the outer ring and the top plate portion.

4. The motor according to claim 3, wherein an upper surface of the top plate portion is exposed from the holder main body.

5. The motor according to claim 1, wherein the ring includes a flange portion which protrudes radially outward, both of an upper surface of the flange portion and a lower surface of the flange portion contact portions of the holder main body in the axial direction.

6. The motor according to claim 1, wherein the first arcuate portion occupies a range of substantially one half of the total circumference of the holder main body in the circumferential direction.

7. The motor according to claim 1, wherein
    the bearing holder further includes a bus bar made of metal that is electrically connected to the stator; and
    a conductive wire is drawn out from the stator and connected to the bus bar through the through-hole of the first arcuate portion.

8. The motor according to claim 7, wherein
    the bus bar includes a plurality of sets of terminals through which a current of each phase of a three-phase alternating current supplied to the stator flows; and
    the through-hole is located below the plurality of sets of terminals.

9. The motor according to claim 1, wherein
    a portion of the motor is disposed in a liquid environment;
    the motor further includes a second bearing interposed between the casing and the shaft;
    the first bearing is located above the stator;
    the second bearing is located below the stator; and the casing extends over a first area in a gas environment and a second area in the liquid environment that is located below the first area.

10. The motor according to claim 9, wherein, during an operation of the motor, a temperature of a gas in the first area is lower than a temperature of a liquid in the second area.

11. The motor according to claim 9, wherein the shaft protrudes from the casing toward the second area.

12. The motor according to claim 11, wherein
a dimension of the second bearing in the axial direction is larger than a dimension of the first bearing in the axial direction; and
a dimension of the second bearing in a radial direction is larger than a dimension of the first bearing in the radial direction.

13. The motor according to claim 1, wherein the bearing holder is a resin molded product including the ring embedded therein.

14. The motor according to claim 1, wherein the ring includes a circumferential contact surface contacting the holder main body in the circumferential direction.

15. The motor according to claim 14, wherein
the ring includes a convex portion protruding radially outward in a portion in the circumferential direction or a concave portion that is concaved radially inward in the circumferential direction; and
the convex portion or the concave portion defines the circumferential contact surface.

* * * * *